Jan. 31, 1967  R. L. ERICKSON  3,301,428
MILK CARTON CONTAINER

Filed Dec. 9, 1963  2 Sheets-Sheet 1

INVENTOR
ROBERT L. ERICKSON
BY
Rudolph L. Lowell
ATTORNEY

Jan. 31, 1967   R. L. ERICKSON   3,301,428
MILK CARTON CONTAINER

Filed Dec. 9, 1963   2 Sheets-Sheet 2

INVENTOR
ROBERT L. ERICKSON
BY Rudolph L. Powell
ATTORNEY

United States Patent Office 3,301,428
Patented Jan. 31, 1967

3,301,428
MILK CARTON CONTAINER
Robert L. Erickson, Des Moines, Iowa, assignor to C. E. Erickson Co., Inc., Des Moines, Iowa, a corporation of Iowa
Filed Dec. 9, 1963, Ser. No. 328,814
2 Claims. (Cl. 220—4)

This invention relates to a crate or container and more particularly to a container or case for receiving a plurality of milk cartons.

It is the object of the invention to provide an improved container for milk cartons wherein the wall structure of the container is of a form to engage selected portions of the cartons so as to retain those portions of a carton which are subject to leakage in a spaced relation from the container.

Another object of the invention is to provide a case for milk cartons which permits free drainage of water from the outer surface of the cartons and the case and allows air to circulate about cartons positioned in the case.

Still another object of the invention is to provide a bottom wall for a milk carton container which has a plurality of separated upstanding portions having smooth and rounded peripheral edges to provide obstruction free surfaces for the bottom of the milk cartons.

A further object of the invention is to provide a milk carton container which has longitudinal and transverse symmetry and is usable with automatic material handling equipment and can be stacked without injury to the cartons positioned in the container.

Another object of the invention is to provide a milk carton container which protects the cartons from outside objects and keeps the cartons clean.

An additional object of the invention is to provide a durable and rigid container for milk cartons which is sturdy in construction, economical in cost and easy to clean.

These and other objects and advantages of this invention will become readily apparent upon reference to the following description and accompanying drawing, wherein.

Figure 1:
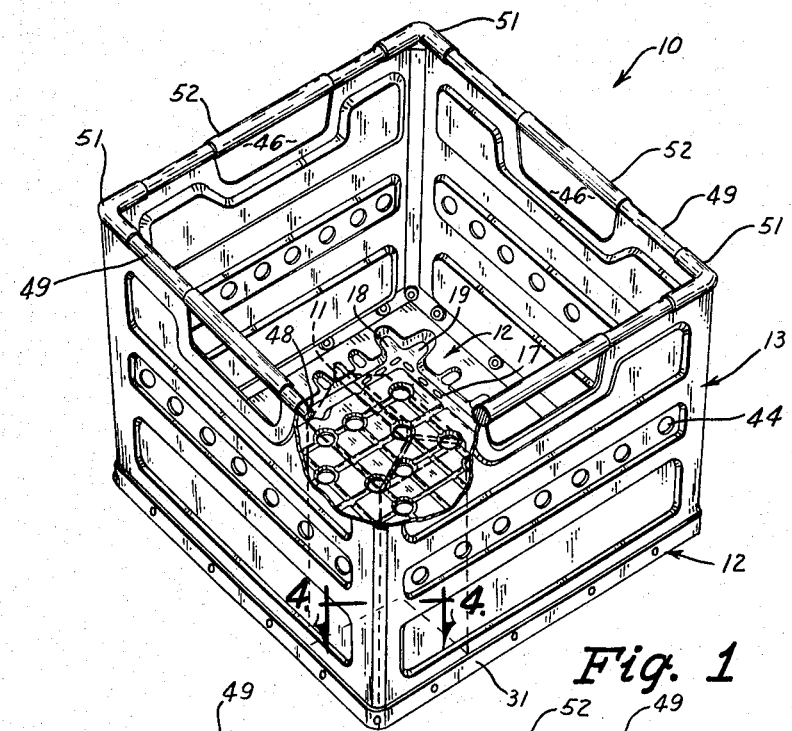
FIG. 1 is a perspective view of the container case of the invention.

Referring to the drawing, there is shown in FIG. 1 a box-shaped container or crate 10. Positioned in the crate 10 are a plurality of milk cartons 11.

The crate 10 is of a substantially square shape and has longitudinal and transverse symmetry. The crate 10 has a substantially square one-piece bottom plate or wall 12 and four side walls 13 which extend upwardly adjacent the peripheral edges of the bottom wall 12. Each of the side walls 13 is identical in construction and interlocks with the adjacent side wall to form a unitary structure. The top of the crate 10 is open.

Figure 2:
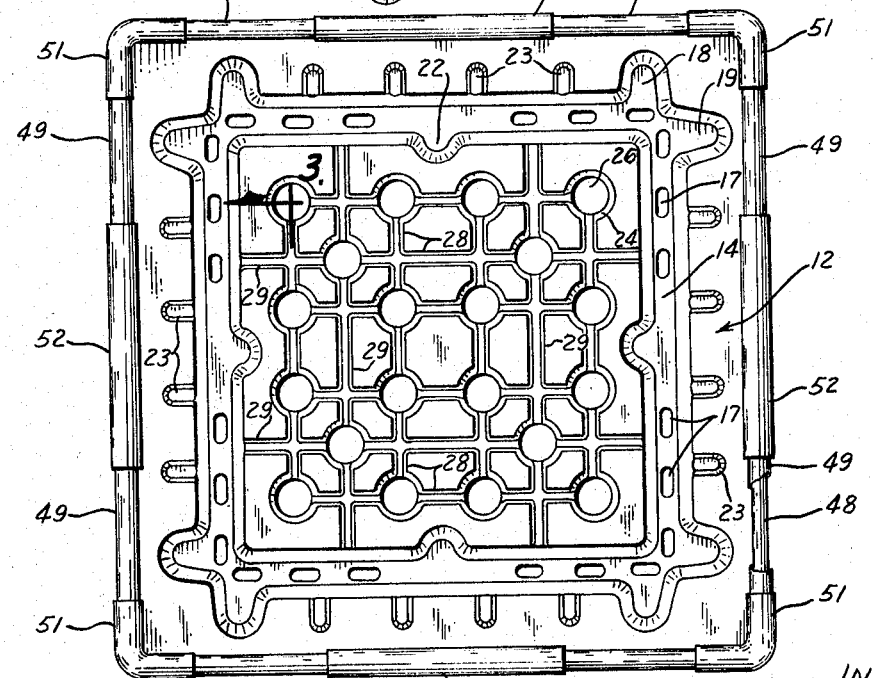
FIG. 2 is an enlarged top plan view of the case of FIG. 1.

The bottom wall 12 is formed from a one-piece metal plate material, such as 20 gauge sheet steel. As shown in FIG. 2, the bottom wall 12 has a downwardly directed furrow 14 extended around the bottom wall 12 in a substantially parallel relation with the peripheral sides thereof. The furrow 14 defines a continuous groove which is in a concentrically spaced relation with the side walls 13, so as to form in the top surface of the bottom wall 12 a channel of a square shape in top plan elevation.

Figure 3:
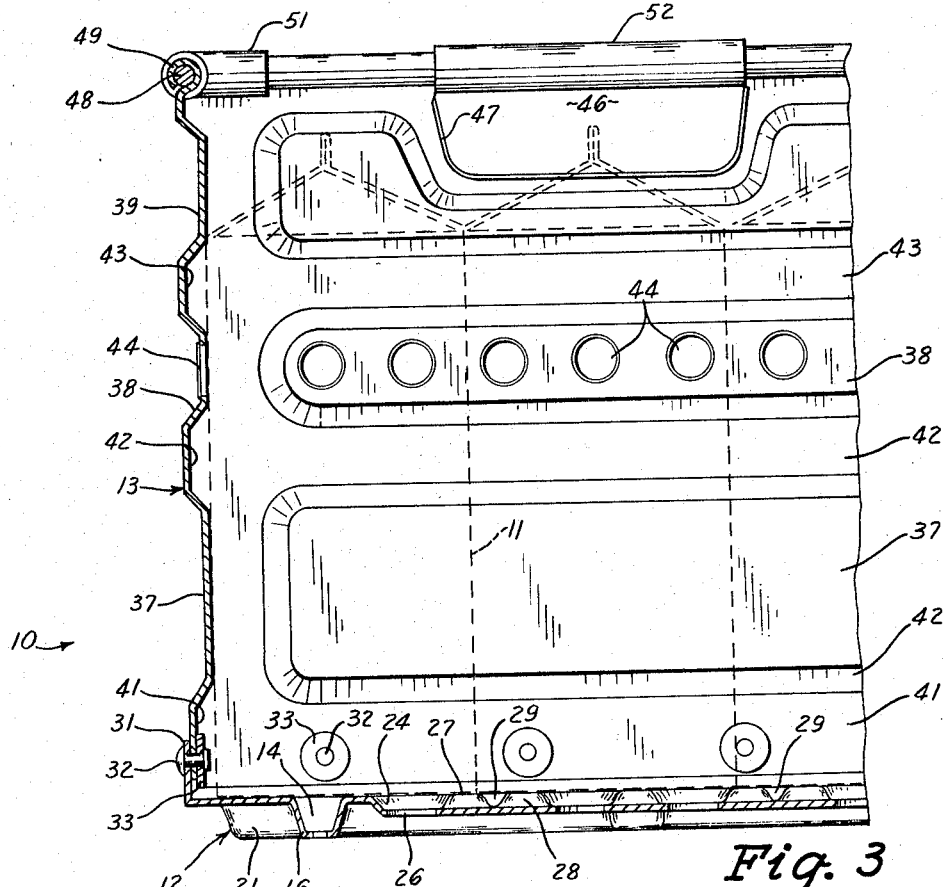
FIG. 3 is an enlarged sectional view taken along the line 3—3 of FIG. 2.

As shown in FIG. 3, the furrow 14 forms on the bottom surface of the wall 12 a ridge 16 of a square shape in bottom plan elevation. The bottom of the furrow 14 has a plurality of drainage holes 17 which prevent the accumulation of liquid in the furrow 14.

Each corner of the square furrow 14 is formed with a pair of outwardly projected finger extensions 18 and 19 angularly disposed about 90 degrees apart so that each finger extension lies in a plane normal to an adjacent side wall of the crate. The finger extensions 18 and 19 are of the same depth as the furrow 14 and are in registration therewith and form downwardly directed projections 21 at each corner of the crate one of which is shown in FIG. 3. Each projection 21 terminates inwardly from the plane of a corresponding adjacent side wall 13. In use, the projections 21 of a first crate coact with the top of the side walls of a second crate positioned below the first crate to maintain a stacked relationship between the crates.

The inside wall of each side section of the furrow 14 has an inwardly projected central recess 22 which opens into the furrow 14. In order to provide for the drainage of liquid from the peripheral sections of the bottom wall 12 into the furrow 14, the bottom wall 12 is provided with a plurality of spaced grooves 23 which project in an outward direction from and open into the outside wall of the furrow 14. The grooves 23 have a lesser depth than the furrow 14.

To insure drainage of liquid from the center area of the bottom wall 12 and to ventilate the interior of the crate 10, the square center section of the wall 12 located within the area defined by the furrow 14 has a plurality of downwardly directed circular depressions 24, each of which contains a drainage hole 26. As shown in FIG. 3, the hole 26 is positioned in the bottom of the circular depression 24 and lies in a plane which is below the plane of the top surface 27 of the bottom wall 12 thereby preventing the bottom wall of the milk carton 11 from engaging the edges of the depression 24 which forms the holes 26. As best appears in FIG. 3, the sides of the circular depression 24 have a rounded contour forming a smooth rounded surface with the top surface 27 of the wall 12. To insure drainage and ventilation below the bottom wall 12 the plane of the holes 26 is above the plane of the bottom of the ridge 16 thereby providing a space between the center area of the bottom wall 12 and the crate supporting surface.

As shown in FIG. 2, the bottom wall 12 has four identical groups of holes 26 positioned symmetrically within the square central area of the bottom wall 12. Each group has five holes arranged in a quintet pattern with four of the holes defining the corners of a square and the quintan hole positioned at the center of the square. The adjacent corner holes are interconnected with rectangular coordinate grooves 28 which open into the depressions 24. The quintan holes of each group are interconnected by rectangular coordinate grooves 29 which open into the furrow 14 and the depressions surrounding the quintan holes. The grooves 28 and 29 intersect in the areas between the corner holes dividing the top surface 27 of the bottom wall 12 into separate upstanding portions. Each of these portions has smooth and rounded peripheral edges thereby providing obstruction free surfaces for supporting the cartons 11. The coordinate grooves 28 and 29 form a pattern of canals or channels for the drainage of liquid from the top surface 27 of the bottom wall 12 into the holes 26 and the furrow 14.

As shown in FIG. 3, the peripheral edges of the bottom wall 12 have an upwardly extended integral flange 31. The lower edges of the side walls 13 are positioned adjacent the inside surface of the flange 31 and are secured thereto by a plurality of rivets 32. The rivets 32 extend through washers 33 positioned adjacent the inside surface of the side walls 13 to reinforce the metal adjacent the rivets 32.

Figure 4:
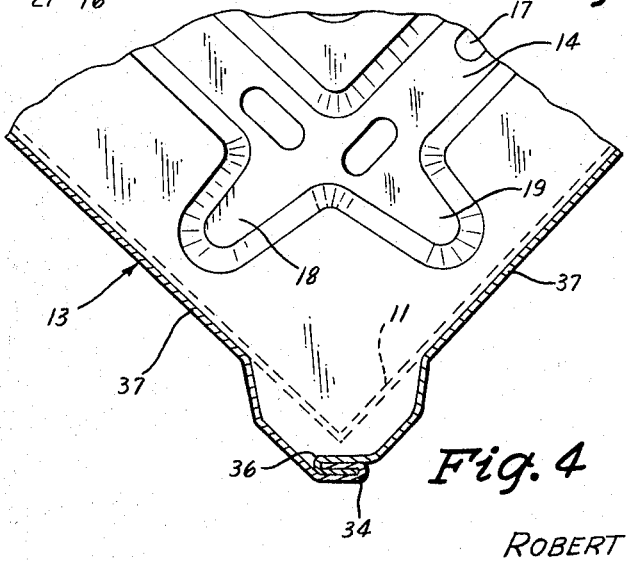
FIG. 4 is an enlarged sectional view taken along the line 4—4 of FIG. 1.

The four side walls indicated generally by the reference numeral 13 are identical in construction. As shown in FIG. 4, the adjacent ends have reverse bent flanges 34 and 36 which are interlocked providing a smooth and rigid corner joint.

As shown in FIG. 3, each side wall has a bottom panel 37, a middle panel 38, and a top panel 39 which are embossed in an inward direction. The panels 37, 38 and 39 extend substantially parallel to each other and are vertically spaced from each other. The peripheral rims of the panels have rounded corners and edges and terminate inwardly from each end of the side wall to keep the corners of the cartons 11 from engaging the corners of the side walls 13. The bottom panel 37 extends parallel to the bottom wall 12 and is spaced above the plane of the top surface 27 thereof. The space defined by the wall section 41 between the lower inclined side 42 of the panel 37 and the bottom wall 12 functions as a ventilating and drainage channel or passage. The space defined by the wall sections 42 and 43 between the middle panel 38 and the bottom panel 37 and the middle panel 38 and the top panel 39, respectively, provides additional ventilating passages or channels around the sides of the containers 11 positioned in the crate. The middle panel 38 has a plurality of horizontally spaced air openings 44.

As shown in FIG. 1, the center portions of the top sections of the side walls 13 have downwardly extending openings 46 which have a substantially rectangular shape so as to accommodate a person's hand. As shown in FIG. 3, the top edges 47 of the side walls defining the openings 46 are folded back into a lapped relation to provide smooth edges about the openings 46.

As shown in FIG. 1, the top edges of the side walls 13 are reinforced with a rod 48 which is secured to the top peripheral portions of the side walls 13. As shown in FIG. 3 spaced top portions 49 of each side wall are wrapped or rolled about the rod 48 to form a smooth unobstructed connection of the rod with the side walls.

As shown in FIG. 1, the rolled top portions 49 at the corners of the crate are reinforced with right angular shaped split clips 51 which are clamped about the adjacent ends of the top portions 49. The portions of the rod 48 which extend over the openings 46 are reinforced by split sleeves 52 which are clamped about such rod portions. The sleeves 52 increase the diametrical dimension of the rod 48 and function as convenient hand grips.

In use, the milk cartons 11 are placed in the crate 10 in a side-by-side relationship. The cartons 11 rest on the upstanding portions of the top surface 27 of the bottom wall 12 with the side walls of certain of the cartons in engagement with the smooth inside surfaces of the panels 37, 38 and 39.

As shown in FIG. 3 the coordinate grooves 28 and 29 and the furrow 14 provide ventilating and draining passages below the bottom of the milk cartons 11. The holes 17 and 26 in the bottom wall function as drainage and ventilating openings which are in communication with the furrow 14 and the coordinate grooves 28 and 29.

As shown in FIG. 4, the panels 37, 38, and 39 in the side walls 13 hold the leak producing corners of the cartons 11 out of engagement with the corners of the side walls 13. The space between the panels provides ventilating and drainage passages adjacent the sides of the cartons 11.

After the crate 10 has been filled with milk cartons it may be stacked on top of a similar crate. The projections 21 on the bottom surface of the wall 12 of the crate 10 coact with the top edge of the bottom crate to maintain the stacked relationship between the crates.

In summary the box-shaped crate 10 has a bottom wall 12 and side walls 13 which have smooth surfaces for positioning the milk cartons 11 in the crate so that the leak producing areas of the cartons normally at the corners of the cartons are spaced away from the corners of the crate. In addition the bottom wall and side walls of the crate are shaped to permit the free drainage of water from the crate and allow air to circulate about the cartons 11 positioned in the crate.

The invention has been described with respect to a preferred embodiment. It is to be understood that it is not to be so limited since changes can be made therein which are within the full intended scope of this invention as defined by the appended claims.

I claim:
1. A crate for milk cartons comprising:
 (a) a bottom wall including plate means, the top surface of said plate means having a plurality of spaced rounded countoured depressions, the bottom of each depression having a hole, furrow means having rounded countoured sides extended about the plate means adjacent the sides thereof, and rectangular coordinate groove means having rounded contoured sides and opening into the spaced depressions and said furrow means, said furrow means being formed with a plurality of holes and having a depth greater than said groove means; and an upright peripheral flange on said plate means,
 (b) side walls having end sections, top sections and bottom sections, each of said side walls having a plurality of inwardly extended substantially horizontal panels which are laterally spaced from each other and terminate adjacent said end sections,
 (c) means securing the bottom sections of the side walls to the upright peripheral flange on the plate means, and
 (d) rod means secured to the top sections of said side walls.
2. The crate defined in claim 1 wherein the furrow means of said bottom wall includes:
 (a) finger extensions projected toward the peripheral flange of the plate means.

References Cited by the Examiner
UNITED STATES PATENTS

| | | | |
|---|---|---|---|
| 1,834,273 | 12/1931 | Enock. | |
| 1,987,764 | 1/1935 | Walker. | |
| 2,464,343 | 3/1949 | Praeger | 220—97 |
| 2,592,797 | 4/1952 | Erickson | 220—4 |
| 2,918,190 | 12/1959 | Martin | 220—4 |

LOUIS G. MANCENE, *Primary Examiner.*